(12) United States Patent
Yeiser, IV

(10) Patent No.: US 10,239,086 B2
(45) Date of Patent: *Mar. 26, 2019

(54) GARDEN FOUNTAIN

(71) Applicant: John O. Yeiser, IV, Santee, CA (US)

(72) Inventor: John O. Yeiser, IV, Santee, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/875,778

(22) Filed: Jan. 19, 2018

(65) Prior Publication Data

US 2018/0141075 A1 May 24, 2018

Related U.S. Application Data

(63) Continuation of application No. 15/457,704, filed on Mar. 13, 2017, now Pat. No. 9,873,134, which is a continuation of application No. 14/806,792, filed on Jul. 23, 2015, now Pat. No. 9,592,525, which is a continuation of application No. 13/908,722, filed on Jun. 3, 2013, now Pat. No. 9,108,212.

(60) Provisional application No. 61/655,334, filed on Jun. 4, 2012.

(51) Int. Cl.
*A01G 9/02* (2018.01)
*A01G 27/00* (2006.01)
*B05B 17/08* (2006.01)

(52) U.S. Cl.
CPC .............. *B05B 17/08* (2013.01); *A01G 9/02* (2013.01); *A01G 27/003* (2013.01)

(58) Field of Classification Search
CPC .......... B05B 17/08; A01G 9/02; A01G 9/023; A01G 27/001; A01G 27/003; A01G 27/005; A01G 27/02; A01G 27/04; A01G 27/06

See application file for complete search history.

(56) References Cited

U.S. PATENT DOCUMENTS

| | | | |
|---|---|---|---|
| 183,163 A | 10/1876 | Hegarty | |
| 1,453,216 A | 4/1923 | Weidig | |
| 1,928,799 A | 10/1933 | Stevens | |
| 3,691,787 A * | 9/1972 | Kaufmann | ........... B67D 1/0055 |
| | | | 222/146.6 |
| 3,713,583 A | 1/1973 | Gruber | |
| 3,841,023 A | 10/1974 | Carlyon | |
| 5,127,366 A | 7/1992 | Kim | |
| 5,326,032 A | 7/1994 | Quillin | |
| 6,505,782 B1 | 1/2003 | Yen | |
| 2005/0274816 A1 | 12/2005 | Yen | |
| 2007/0130829 A1 | 6/2007 | Barnhill | |

* cited by examiner

*Primary Examiner* — Darren W Gorman
(74) *Attorney, Agent, or Firm* — Eleanor Musick; Musick Davison LLP

(57) ABSTRACT

The garden fountain includes a lower container, a middle container and an upper container. A water pump positioned in the lower container pumps water up into the middle container. The upper container rests in the middle container. Using a combination of the water level in the middle container and the spacing of the bottom of the upper container with respect to the water level in the middle container, the user can accurately control the water flow to the upper container.

9 Claims, 8 Drawing Sheets

GARDEN FOUNTAIN

RELATED APPLICATIONS

This is a continuation of application Ser. No. 15/457,704, filed Mar. 13, 2017, issued as U.S. Pat. No. 9,873,134, which is a continuation of application Ser. No. 14/806,792, filed Jul. 23, 2015, issued as U.S. Pat. No. 9,592,525, which is a continuation of application Ser. No. 13/908,722, filed Jun. 3, 2013, issued as U.S. Pat. No. 9,108,212, which claims the priority of U.S. Provisional Application No. 61/655,334, filed Jun. 4, 2012, each of which is incorporated herein by reference.

FIELD OF THE INVENTION

The present invention relates to fountains, and more particularly, to a garden fountain that is capable of containing and watering one or more plants.

BACKGROUND

Currently there are no known fountains that operate as both planters and fountains. Such concept provides both functionality to a planter while also providing for an aesthetically pleasing landscape design element.

SUMMARY

According to one implementation, the garden fountain includes an upper bowl, a middle bowl and a lower bowl. The upper bowl has a base configured to rest within the middle bowl. A pump is disposed in the lower bowl and configured to pump water up into the middle bowl. The water pumped from the lower bowl to the middle bowl maintains a specific water level in the middle bowl. The upper bowl is configured to hold soil and an associated plant and includes means for passing water from a bottom thereof into the soil. The positioning of the bottom of the upper bowl in the middle bowl and the water level in the middle bowl determines the amount of water provided to the soil of the upper bowl and associated plant.

According to another implementation, the garden fountain includes an upper bowl, a middle bowl having waterspouts, and a lower bowl. The upper bowl has a base configured to rest within the middle bowl. A base is configured to support the lower bowl on the ground or other stable surface, and includes a battery compartment contained therein. A pump is disposed in the lower bowl and is configured to pump water up into the middle bowl. Water pumped from the lower bowl to the middle bowl maintains a specific water level in the middle bowl. The pump is electrically connected to the battery contained the base battery compartment. The upper bowl is configured to hold soil and an associated plant, and includes means for passing water from a bottom thereof into the soil. The position of the upper bowl in the middle bowl and the water level in the middle bowl determines the amount of water provided to the soil of the upper bowl and associated plant.

Other aspects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views.

DETAILED DESCRIPTION

Figure 1:
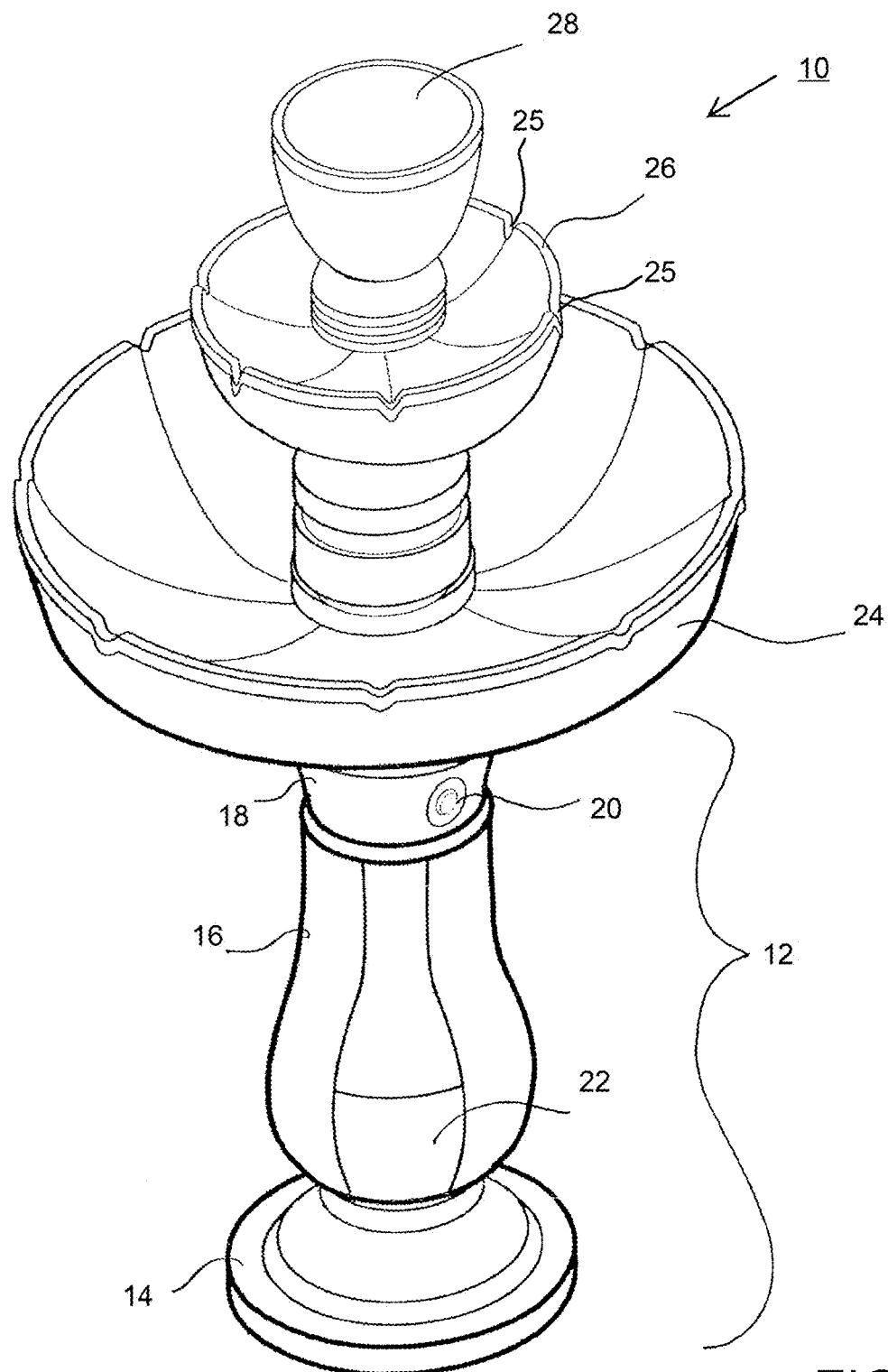
FIG. 1 is perspective view of the garden fountain according to an implementation of the present principles.

Referring to FIG. 1, there is shown a garden fountain 10 according to an implementation of the present principles. The garden fountain 10 includes a base 12, a lower or reservoir bowl 24, a middle bowl 26 and an upper or planter bowl 28. The base 12 can be made up of one or more parts and is shown in the present example having a footing 14, a central shaft 16 and a bowl support 18. A power button 20 can be disposed in any suitable location and is shown here integrated into the bowl support 18. A battery compartment 22 is preferably disposed in the base of the central shaft 16, or the footing 14 (if of suitable size)

The connection of the lower bowl to the footing can be achieved in any suitable known manner. For example, a slot and groove mechanical engagement where the parts are fitted together and rotated to secure the connection could be used. Such slot and groove configuration could also be used to connect the middle bowl 26 to the lower bowl 24. O-rings or other water sealing means can be used in any relevant application for the connection of the various parts of the fountain.

In addition, those of skill in the art will appreciated that each of the parts of the garden fountain 10 can be made of any suitable known material, which may include, but is not limited to, molded plastics.

Figure 2A:
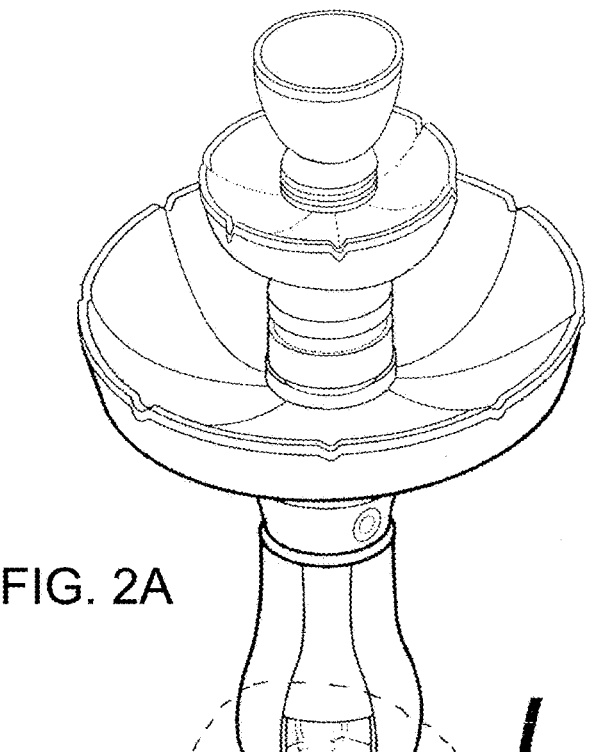
FIG. 2A is a perspective view of the garden fountain showing the battery compartment in the base, according to an implementation of the present principles.
Figure 2B:
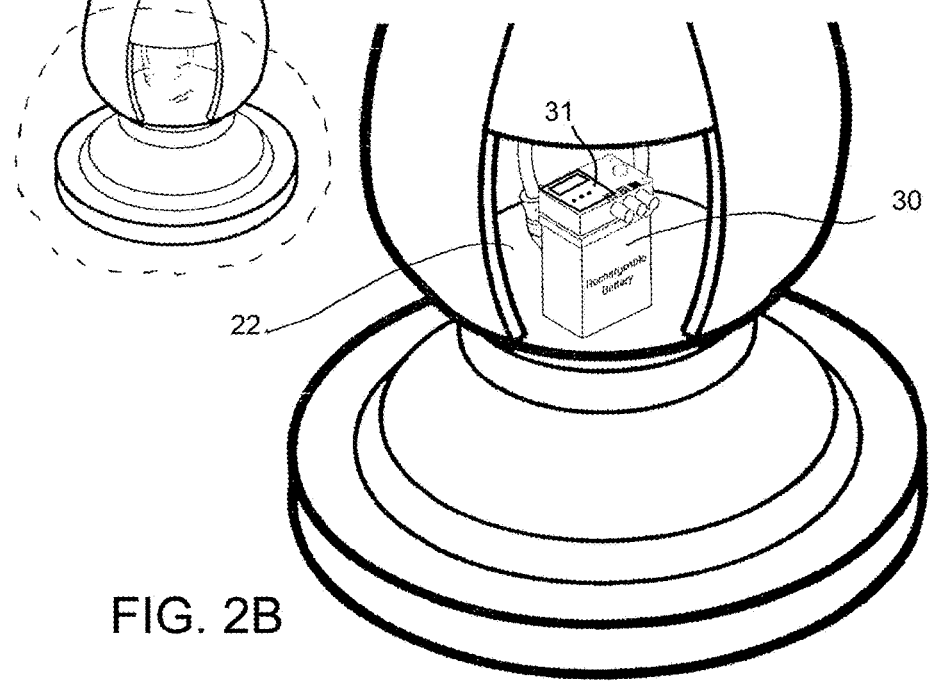
FIG. 2B is an exploded view of the battery compartment shown in FIG. 2A.

FIGS. 2A and 2B show the battery compartment 22 having a battery 30 contained therein. In this preferred implementation the battery is rechargeable and the battery compartment is preferably sealed from water such that the user may easily access the same without any concerns relating to the water contained within the lower and middle bowls. Ideally, the battery compartment should have at least one opening to the outside air so as to prevent the formation of condensation in the compartment and thereby any negative effects to the battery as a result of the same. Those of skill in the art will appreciate that the access panel for the battery compartment can be configured in any suitable manner, such as for example, a sliding panel, a hinged panel, and may also include a locking mechanism.

In one implementation, the rechargeable battery or batteries 30 can be recharged using a solar system (not shown), and/or using household electric power. Alternatively, the batteries can be made to be disposable. In addition to rechargeable power means, timing system 31 can be implemented where individual buttons are preset for predetermined time periods, or adjustable timing means are implemented.

In other implementations, the power source for the fountain can be solar powered, A/C powered using 110 v, 210 v and/or DC powered using a 12 v battery.

It is further contemplated that the garden fountain system may include a lighting system that provides accent lighting the fountain and/or the plant in the upper bowl planter. The positioning of the lights cans be within or out of the water.

Figure 3:
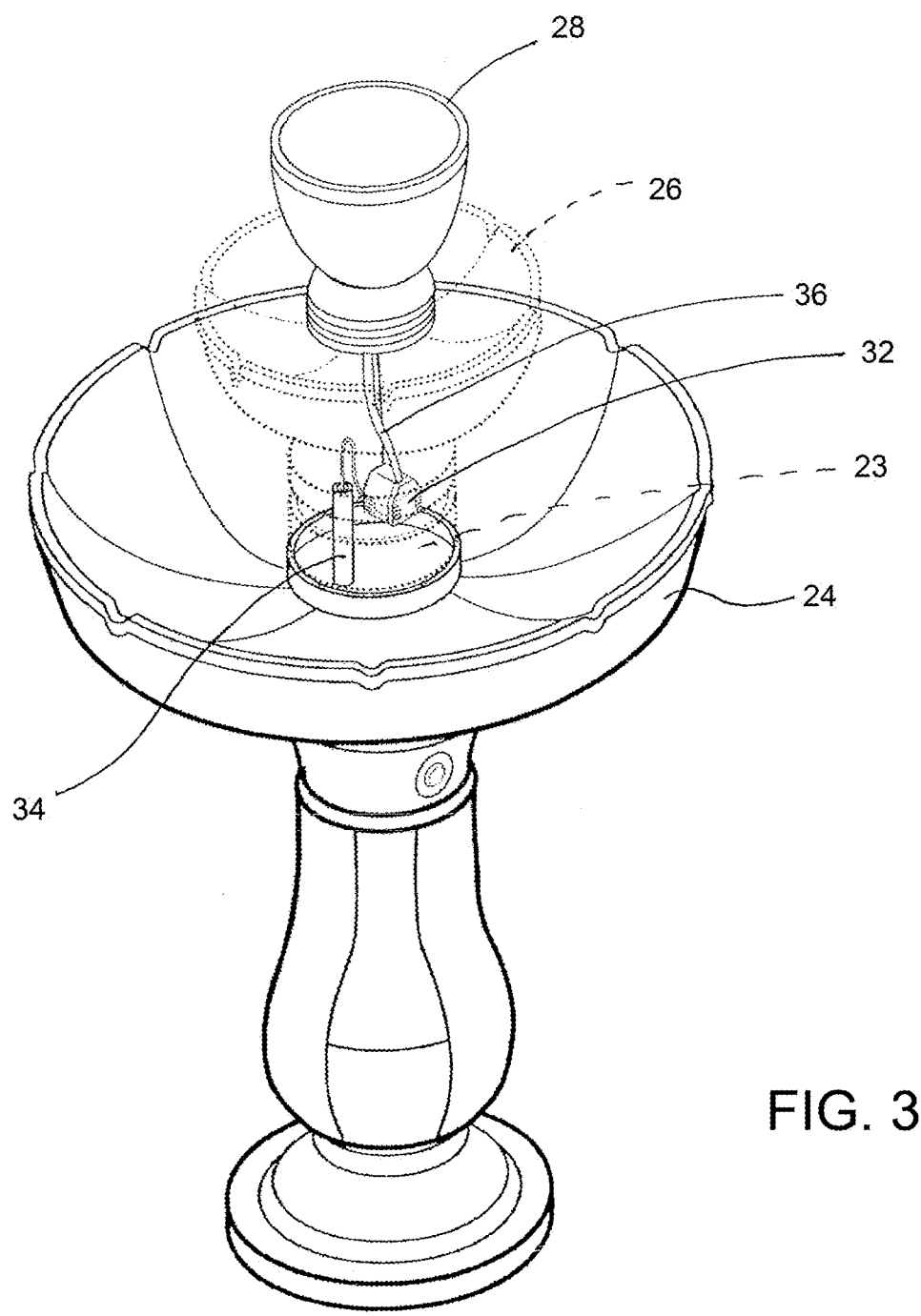
FIG. 3 is a perspective view of the garden fountain, shown partially in phantom, according to an implementation of the present principles.
Figure 5:
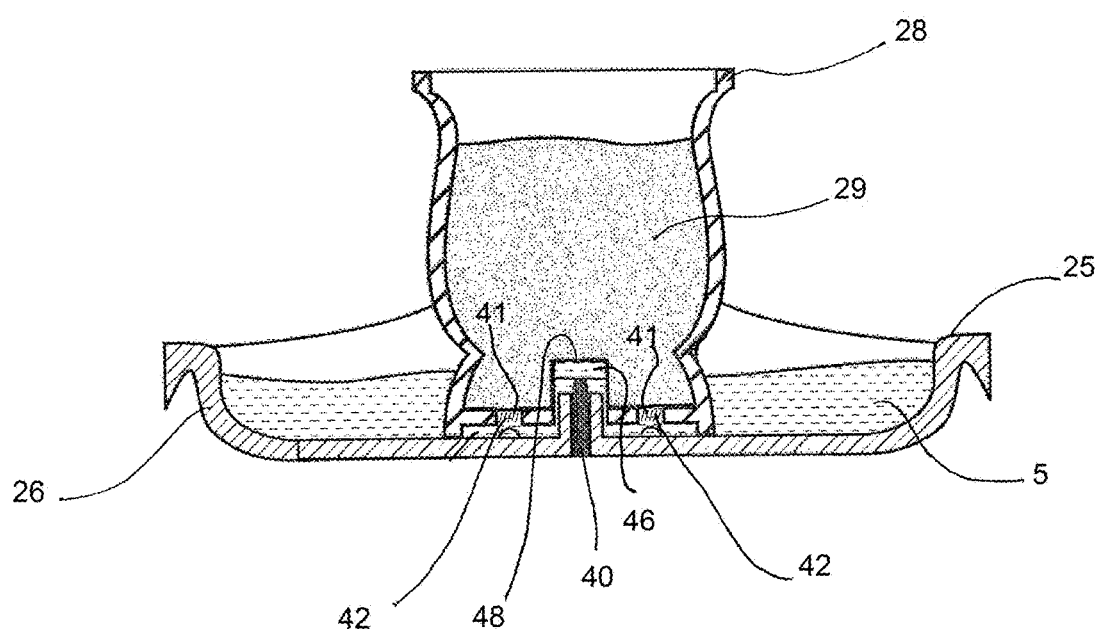
FIG. 5 is a cross-sectional view of the taken down the center and showing the plant watering feed system, according to an implementation of the invention.

FIGS. 3 and 5 illustrate one example of the disposition of the pump 32 within the shaft 23 positioned within the lower/reservoir bowl 24 and configured to support the middle bowl 26. The pump 32 includes a power connection 34 which is connected to the battery 30 positioned in the base 16. The pump 32 sits in the bottom of the shaft 23 and is configured to draw water from the lower/reservoir bowl 24 and the pump feeds the same to the middle bowl 26 via a tube 36 connected to a water input connection 40 in the center of the middle bowl 26.

Figure 4:
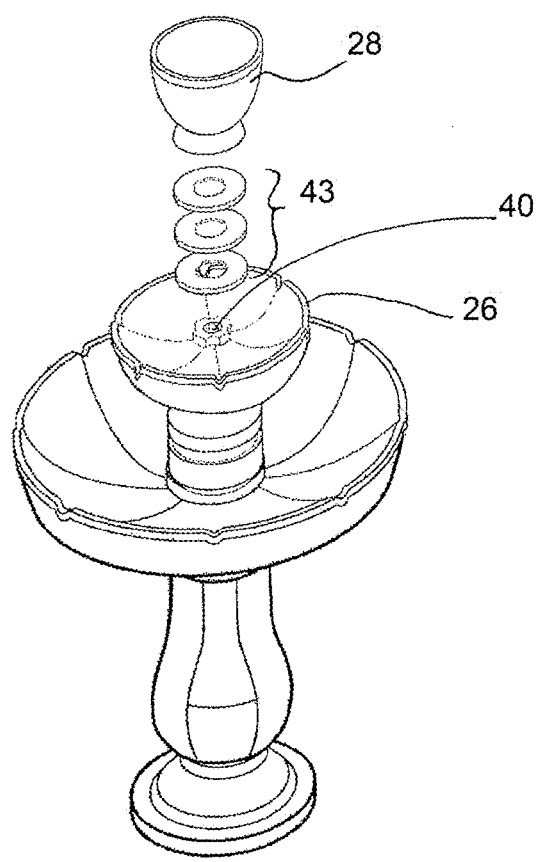
FIG. 4 is an exploded view of the planter portion of the garden fountain, according to an implementation of the present principles.

Referring to FIGS. 3 and 4, the upper bowl 28, positioned siting within the middle bowl 26. In a preferred implementation, the upper bowl 28 is configured as planter. As shown in FIG. 5, the upper bowl 28 includes a number of openings 42 at the bottom thereof. The openings 42 allow the transfer of water from a middle bowl 26, into upper bowl 28 when the water level rises in bowl 26 to a predetermined level. Bowl 26 has water introduced via a pump 32, (FIG. 3), drawing water from bottom of a lower bowl 24, (i.e., a reservoir bowl).

As shown in FIG. 3, the pump can be located in the lower reservoir bowl 24, and as shown in the present example, the pump 32 is positioned within the shaft supporting the middle bowl 26. Those of skill in the art will appreciate that any suitable known type of pump 32 with an appropriate water intake can be used. According to one implementation, the pump 32 uses a 6-volt dc pump powered by the rechargeable battery 30 located in the base of the fountain. When the pump is turned on, the water is pumped from lower bowl 24 into the middle bowl 26. The water continues to rise until the water level reaches the pour spouts 25 of middle bowl 26, at which point the water level 5 reaches its maximum height or level in middle bowl 26 and the water pours over back into lower bowl 24. (See FIG. 5)

As shown above, upper bowl 28 sits in middle bowl 26. The distance between the base of middle bowl 26 and base of bowl 28, specifically the water inlets 42 of upper bowl 28 are crucial to the operation. The height of the water level in middle bowl 26 reaches at least to the bottom of the water inlets of upper bowl 28. Discs or spaces 43 can be added or subtracted to achieve the desired position of the base of the upper bowl 28 within the middle bowl 26. As will be evident from the above, height of the upper bowl 26 can be infinitely adjusted using the discs 43 depending on the water level desired/required for the plant in the upper bowl 28. According to one preferred implementation, a minimum height must at least reach the bottom of the water inlets 42 in upper bowl 28 in order for the soil 29 located in upper bowl 28 to be able to draw or wick the water up from middle bowl 26.

Although shown in the form of openings, water inlets 42 can include a porous material 41 of any kind so as to prevent any soil from being undesirably being dispelled from the upper bowl 28 into middle bowl 26.

As mentioned above, the height of upper bowl 28 in relation to middle bowl 26 will be adjustable. The purpose of an adjustable height is such that you can raise or lower the water level in upper bowl 28. This is beneficial since plants require different amounts of water for growing. In the current configuration one or more spacers 43 are used in between upper bowl 28 and middle bowl 26. Any number of or no spacers can be used.

In the configuration of FIG. 4, three (3) spacers 43 are shown. This gives a total of four (4) water level settings. The thickness of the spacers 43 can also be changed to accommodate other spacing options. In one preferred implementation, no spacer present allows upper bowl 28 to sit at its lowest possible setting, providing the highest water level in upper bowl 28. As you add a spacer between the upper bowl 28 and middle bowl 26, bowl 28 will increase in height over middle bowl 26 thus raising upper bowl 28 proportionally higher above middle bowl 26 lowering the water level or line in upper bowl 28. As you add another spacer, this water level will continue to lower in bowl 28 until you can add spacer so that upper bowl 28 water inlets 42 can be completely above the water level in middle bowl 26. The above description is referring to the water level in the active or pump on mode. This is when the water level is at its highest, but at no time does the water level rise above the maximum level provided by the waterspouts 25 in middle bowl 26.

When in the active mode, or pump on mode and the maximum spacer 43 or height of upper bowl 28 is in use, the water level is raised in middle bowl 26 to the maximum height determined by the waterspouts 25. Upper bowl 28 being in its highest setting will only, when in active mode, have water coming in contact with the water inlets 42 in upper bowl. When the fountain is inactive, pump off, the water level will lower to a point just below the maximum water level in middle bowl 26. At this point the water level is lower than the bottom of the water inlets 42 in upper bowl 28. This then provides an air gap necessary for healthy plant growth allowing the soil to aerate, from the bottom up. In this same setting, when the fountain is in active mode, the water level in middle bowl 26 will rise to the maximum height provided by waterspouts 25 in bowl number 26. At such point, the water level will rise to allow the water inlets 42 in upper bowl 28 to come into contact with the water 5 in middle bowl 26. The resulting wicking effect allows the soil 29 in upper bowl 28 to wick the water up into bowl 28, providing water for the plant.

The water level in upper bowl 28 can be adjusted through raising and lowering the bowl in relation to middle bowl 26 with any number of methods, fixed and mechanical. In addition, the water level in upper bowl 28 can be affected or adjusted to provide the proper amount of water to the plant in upper bowl 28 depending on if the fountain is active or inactive.

The above description relates to the adjusting of the water level in upper bowl 28 in the active mode. If you adjust for the inactive mode, upper bowl 28 can be moved to, for example, the lowest setting. This position will place the water inlets 42 of upper bowl 28 to below the maximum water level of middle bowl 26. If the fountain is first active and thus raising the water level in bowl 26 to the maximum level and then turned inactive, the water level will lower slightly to just below the spout level 25. However, upper bowl 28 water inlets 42 can be set so that they are lower than middle bowl 28's maximum level. Therefore, the soil 29 in bowl 28 would continue to wick water up into bowl 28, even in the inactive mode. This provides additional water for different type of plants or weather conditions. This allows middle bowl 26 to act as a reservoir for upper bowl 28 until such time that the soil 29 in bowl 28 has wicked up the maximum amount of water it is capable of and or water has evaporated out of middle bowl 26. When either occurs, this will then lower the water level in middle bowl 26 to below the water inlets 42 in upper bowl 28, thus providing the necessary air gap 12 between upper bowl 28 and middle bowl number 26 to provide healthy conditions for good plant growth.

The shape of the bottom of upper bowl 28 and the bottom of middle bowl 26 is also critical for proper water flow. Although there are numerous ways to introduce water into middle bowl 26, this description is for the current example being shown.

The outlet of a water distribution tube 40 coming from the pump 32 located, for example, in lower bowl number 24, in a preferred embodiment needs to be just slightly higher than the maximum water level provided by the waterspouts 25 in middle bowl 26. This prevents the water from middle bowl 26 from siphoning back into lower bowl 24, thus maintaining the inactive water level in middle bowl 26 once initially filled to maximum water level when active. However, should the water siphon back into bowl 24, this can also be a benefit. In the current embodiment, there is a fill chamber 46 located in the bottom of upper bowl 28, which is female in shape, which matches to the male water distribution pipe 40 in middle bowl 26. This allows the water distribution pipe 40 or tube to be higher than the maximum water level in middle bowl 26 while allowing the water inlet ports 42, located in the corresponding female shape of the bottom of upper bowl 28 to operate below the maximum water level in middle bowl 26.

In a preferred embodiment, water is only introduced into upper bowl 28 through the water inlet ports 42. This allows for a non-pressurized or turbulent water introduction into the soil. If the water from the distribution port in middle bowl 26 was directed straight directly into the soil 29 in upper bowl 28, it would erode the soil and causing excess soil to be introduced into the water system and erode the soil exposing the roots in the plant located in upper bowl 28.

Although this system could have the water distributed to upper bowl 28 on in various manners, direct port from bowl number two into bowl number one. Another is a water distribution pipe pouring water into the top of bowl 28 from bowl 24. The preferred embodiment is to wick the water from the bottom up from bowl number 26 into upper bowl 28 initially when in the active mode then also in the inactive mode as described above.

In the preferred embodiment, it has been found that the water distribution chamber 46 located in upper bowl 28, in relation to the air channels at the bottom of bowl 28, in relation to the water distribution port in middle bowl 26 can create a siphon effect after the fountain is inactive, thus siphoning all the water out of middle bowl 26 into lower bowl 24. This can be considered a positive effect if for example the plant in upper bowl 28 requires less water. To reduce this effect if a small hole 48 is introduced into the top of the water distribution chamber 46, it has been found to break the effect of the siphon, allowing the water to maintain minimum or inactive water height in middle bowl 26. Those of skill in the art will appreciate that there are numerous ways to affect the siphon occurring between middle bowl 26 and lower bowl 24, this is just one of example of the same.

This anti-siphon hole 48 in the top of the water distribution chamber located in bowl 28 can also have a positive effect in providing water to the soil in bowl number one. When in the active mode it can create a method of positive pressure water introduction into upper bowl 28. Although it is considered preferred to allow the water to wick up from bowl number 26 into bowl 28, it could be beneficial in certain situations in which more water is required for a specific plant and the addition water introduction into the soil has a positive effect. However, as this positive pressure water inlet increases in size in relation the water flow or pressure created from the pump, located in bowl 24, it is possible to meter this flow by increasing or decreasing the diameter of this positive water pressure inlet.

Figure 6A:
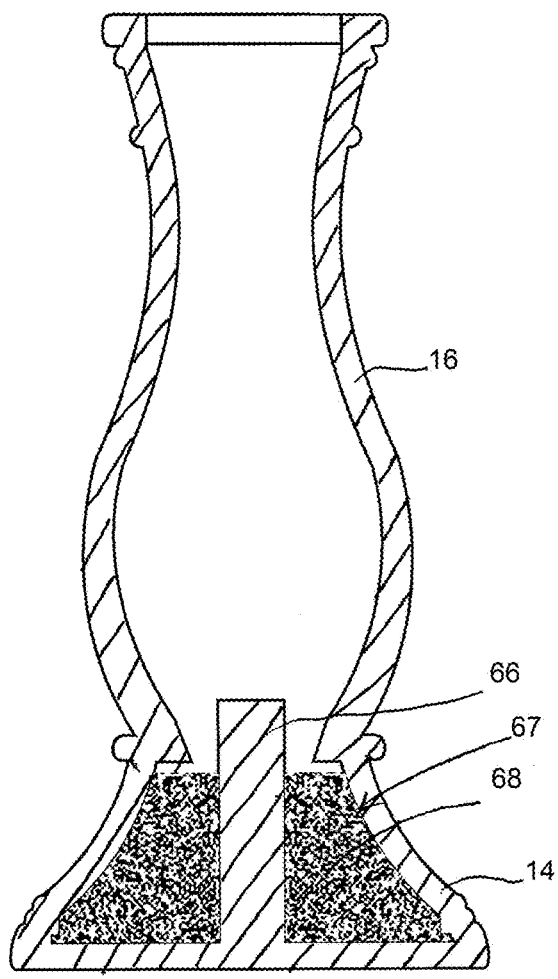
FIGS. 6A and 6B are a cross-sectional view and perspective view, respectively, of the base of the garden fountain according to another implementation of the invention.
Figure 6B:
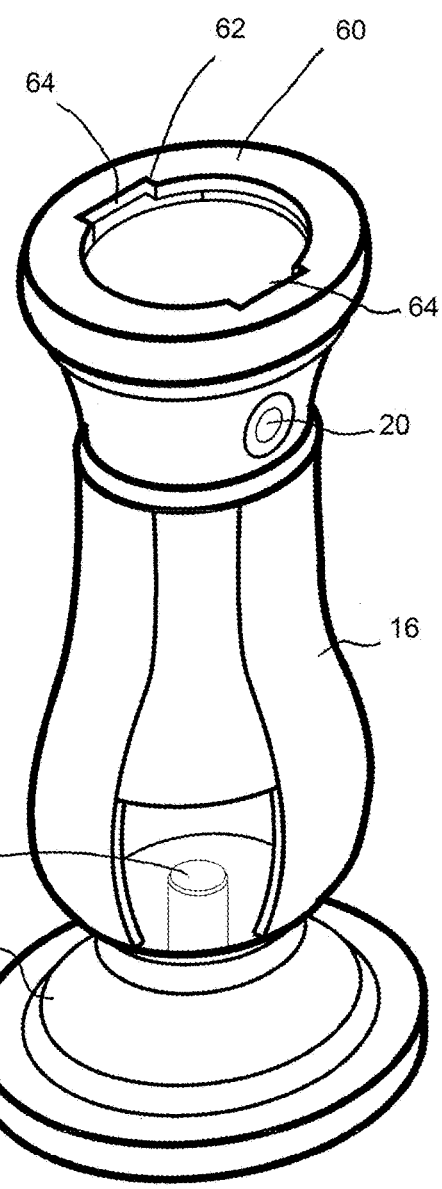

FIGS. 6A and 6B show the base 12 of the fountain according to another implementation of the invention. FIG. 6A shows the bottom 14 of the base being additionally, and adjustably, weighted with a suitable weighting material 68 (e.g., sand)

Typical fountains made of stone, concrete, and any other heavy medium, do not require the ability have an adjustable weighted base as they very nature of their design is heavy.

However, with the recent use of polyresin as the construction medium for the fountain of the present invention, which allows them to be light weight enough to ship for mass merchandising and for easy installation by the end user, they are too light to withstand any type of weather and will fall over with small winds. Simply making the fountain heavier is counter-productive since shipping costs will go up and the installation by the customer becomes more difficult.

According to the present design the fountain can ship in its lightweight format and the end user can then add sand or heavy material 68 to the bottom of the fountain to provide the weight necessary to withstand weather conditions. In this embodiment (as described above), the battery location, combined with the weight chamber is unique. By placing the battery 30 in the lowest possible location to establish a low center of gravity and then adding a chamber 67 below the battery compartment to be filled with a removable weighted material 68 will provide the best center of gravity for the fountain.

By placing the weighting material compartment 67 and battery compartment 22 close to each other, the issue or adding subtracting the weighted material becomes an issue for the end user and for methods of manufacturing. First the method of manufacturing a poly resin fountain utilizes an outer shape for the exterior of the fountain and at the bottom base a panel is glued into place to seal the bottom of the fountain base to the outer shape thus providing rigidity to the outer structure and to finish the cosmetics of the bottom of the fountain. This allows for a hollow inner structure which is both a cost and weight saving and the simplest method of manufacturing. However, this method makes it difficult to make a separated chamber 67 to add material to since there is no inner structure to the fountain.

In the current design a male protrusion 66 which extends from the bottom base cap up into the inner body of the hollow fountain structure has been added. The top of this protrusion 66 becomes the base in which the battery 30 can sit. The diameter of the protrusion 66 is smaller than the inner diameter of the outer structure of the fountain. The distance between the protrusion 66 and the outer structure provides for a conduit allowing the end user to add weighted material into the bottom of the fountain, the weight chamber. The distance between the outer structure and the inner protrusion 66 is critical in that if it is too small it is difficult for the end user to add or remove weighted material and if it is too large, the base of the top of the protrusion 66 is not large enough to support the battery and any other object being stored in the battery compartment. To help in providing the added room from the placement or removal of the weighted material 68, a small indent of any particular shape can be added the protrusion 66, thus maintaining adequate base area to support the battery while increasing the space between the outer structure and the protrusion 66 for ease of adding or removing the weighted material.

This method is preferred over other methods for adding or removing weight. For example, an opening formed in the bottom base panel, with, for example, a plug to add or remove the weighted material, would require that the fountain be turned upside down to add the material. This, in turn, would require that the hollow interior of the fountain have a separate panel molded and attached to the inner wall of the fountain. This panel would have to be sealed to prevent the weighted material from leaking back into the body of the fountain when it is turned upside down to add the weighted material. This added panel would significantly increase the manufacturing cost.

The battery base 16/compartment 22 is also unique to the poly resin fountains for manufacturing reasons as mentioned above, even without the ability to add weighted material. By extending the outer edge of the battery base 16 to the inner dimension of the outer shape, which eliminates the ability to add weighted material, however provides a cost-effective method for production to establish a base for the battery.

FIG. 6B shows a clear view of the top 60 of the base 12. The top 60 includes a keyed slot 62 having keys 64. The keys 64 are configured to receive correspondingly shaped portions of the bottom of lower bowl 24 such that the same is received and rotated in the slot 62 and thereby secured to the top of the base during assembly.

Figure 7A:
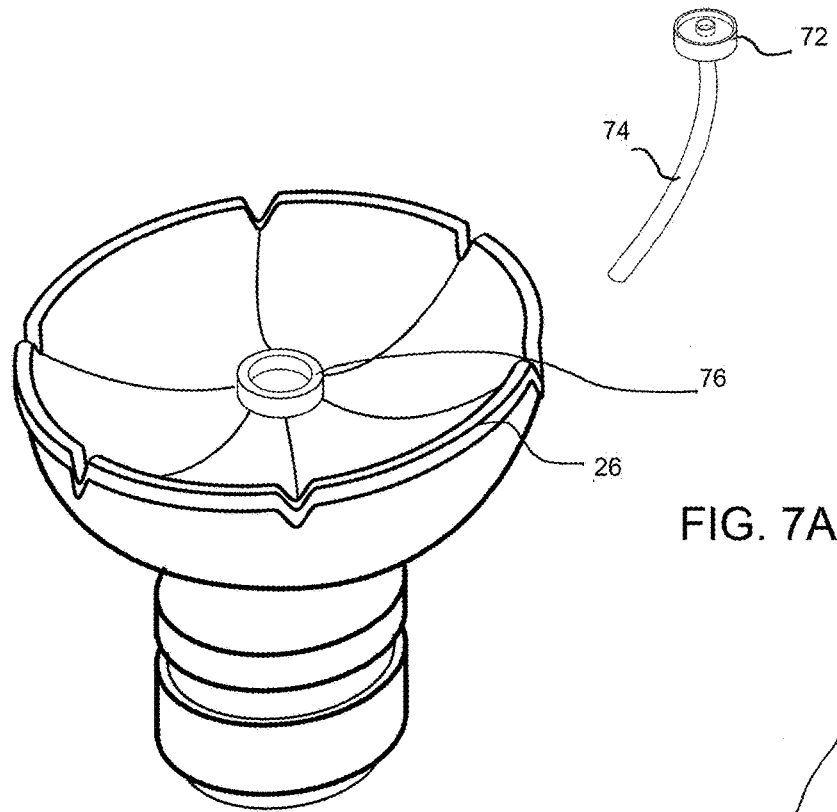
FIGS. 7A and 7b is a perspective view and a cross-sectional view, respective, of the second water tier distribution system according to a further implementation of the invention.
Figure 7B:
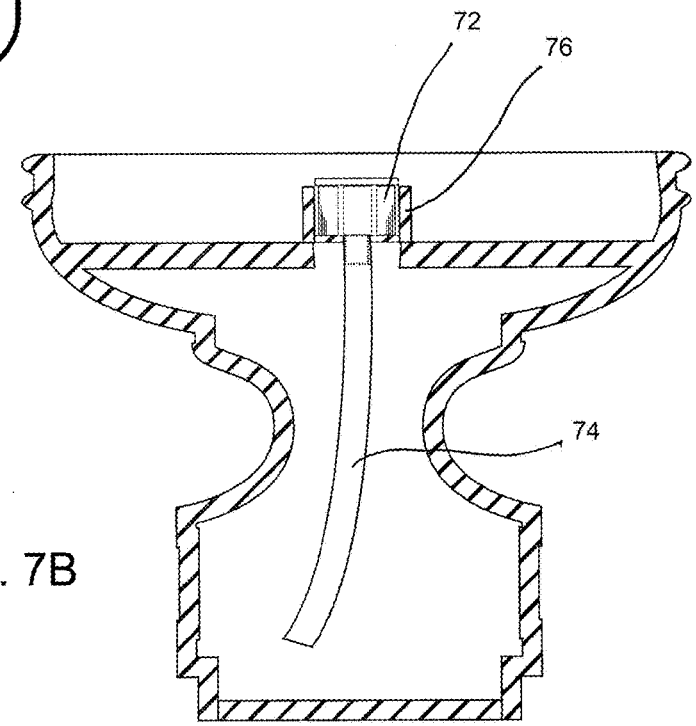

FIGS. 7A and 7B show the configuration of the middle bowl 26 (2.sup.nd water tier) according to an implementation of the invention. The 2.sup.nd water tier water distribution tube in a poly-resin fountain is typically fixed to a molded plastic or resin tube with is the union from the tube exiting the water pump located inside the fountain thru the wall of the resin allowing the water to be distributed to the exterior of the fountain. This method does not allow for the ability to easily change or add new water features by the end user.

According to an implementation, the middle bowl 26 is molded with a large passageway 76 having an inner dimension configured to receive the water distribution plug 72 with hose 74 that can be inserted into the resin. This removable plug 72 allows the end user to pull the tube 74 off of the water feature to be removed and re-attach a new water feature by pressing the water distribution plug in place on the new feature.

Figure 8:
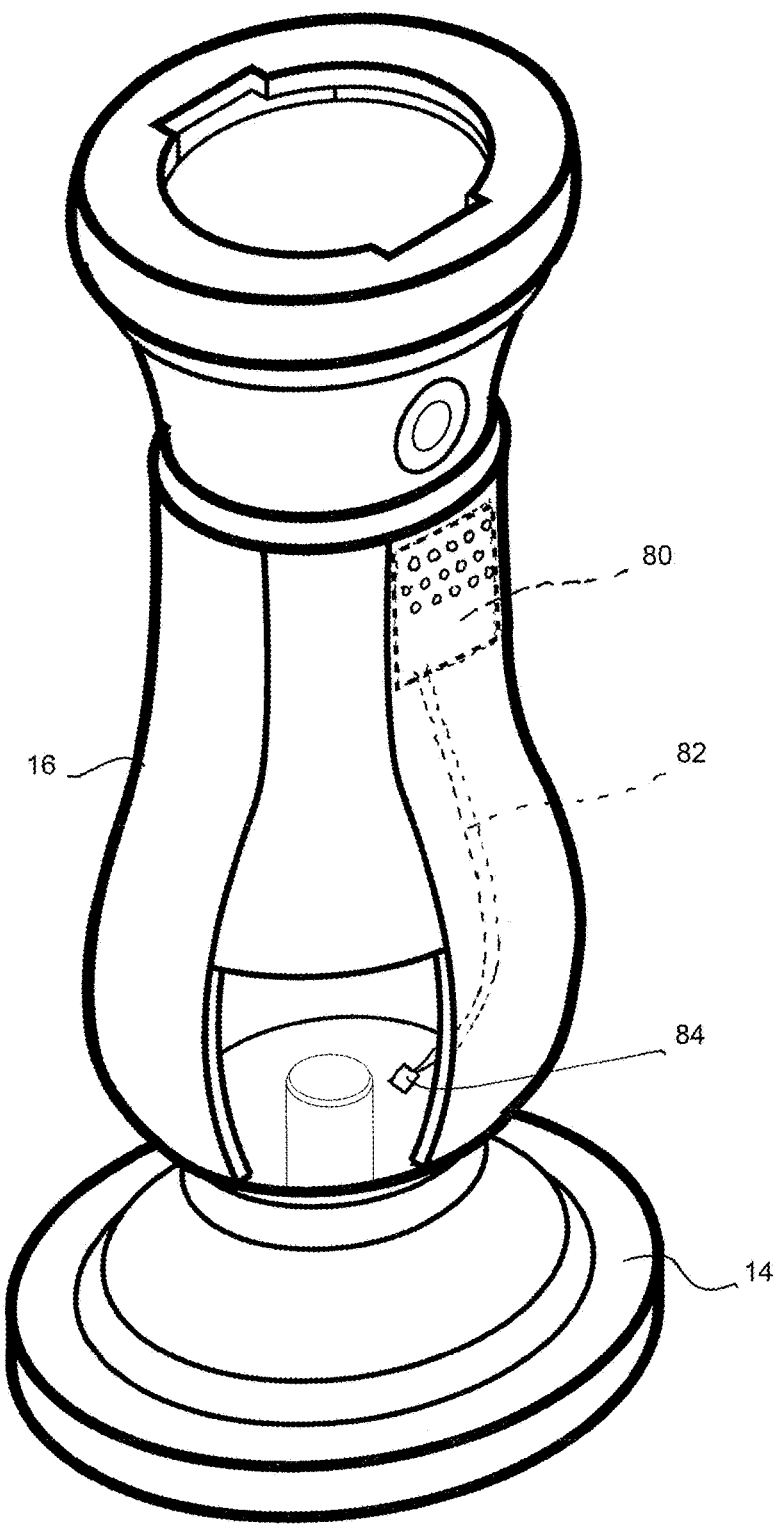
FIG. 8 is perspective view of the base of the garden fountain according to yet a further implementation of the present principles.

FIG. 8 shows another implementation of the base pedestal 16 having a wireless, e.g., Bluetooth®, speaker 80 positioned therein. The speaker is connected to power source via plug 84 and wire 82. The power source connected to plug 84 can be any suitable battery source, and may, depending on the configuration, be connected to the water fountain's primary battery 30. Alternatively, a separate battery can be provided to power the wireless (Bluetooth®) speaker 80. As will be appreciated, the addition of the speaker 80 allows a user to wirelessly transmit audio content to the speaker via their own compatible Bluetooth® audio player or system.

The above description above is for a three-tier fountain. This self-watering garden fountain can be constructed in various configurations. It can have two tiers, with a reservoir located inside or in the base of the bottom tier. Those of skill in the art will appreciate that the fountain of the present invention can be constructed with multiple tiers, with essentially no limit. It can also be constructed with multiple planter bowls, in parallel to each other, vertically stacked to each other, and various other combinations and configurations.

While there have been shown, described and pointed out fundamental novel features of the present principles, it will be understood that various omissions, substitutions and changes in the form and details of the methods described and devices illustrated, and in their operation, may be made by those skilled in the art without departing from the spirit of the same. For example, it is expressly intended that all combinations of those elements and/or method steps which perform substantially the same function in substantially the same way to achieve the same results are within the scope of the present principles. Moreover, it should be recognized that structures and/or elements and/or method steps shown and/or described in connection with any disclosed form or implementation of the present principles may be incorporated in any other disclosed, described or suggested form or implementation as a general matter of design choice. It is the intention, therefore, to be limited only as indicated by the scope of the claims appended hereto.

The invention claimed is:

1. A garden fountain comprising:
   a first container for retaining a first volume of water, the first container having a base portion configured for support on a stable surface;
   a second container disposed above the first container, the second container having an enclosed bottom configured to retain a second volume of water less than the first volume of water, the second container having waterspouts formed therein, wherein the waterspouts release water back into the first container;
   a third container supported on the enclosed bottom of the second container, the third container configured for retaining a third volume of water or material less than the first and second volumes, the third container further comprising inlets for passing water through a bottom thereof; and
   a pump disposed in the first container, the pump configured to pump water into the second container, wherein water pumped from the first container into the second container maintains a specific water level in the second container;
   wherein the third container further comprises at least one spacer configured to support the third container at a predetermined spacing above the enclosed bottom of the second container, wherein a water level in the second container determines an amount of water provided to the third container.

2. The garden fountain of claim 1, wherein the pump is battery-powered, and wherein the base portion further includes an openable battery compartment configured for retaining a battery for powering the pump.

3. The garden fountain of claim 2, wherein the battery is a rechargeable battery.

4. The garden fountain of claim 1, further comprising a timing system for controlling activation of the pump for predetermined time periods.

5. The garden fountain of claim 1, wherein the inlets comprise one or more openings through the bottom of the third container.

6. The garden fountain of claim 1, wherein the waterspouts are configured to return water to the first container only when the water level within the second container exceeds a predetermined level.

7. The garden fountain of claim 1, wherein the base portion comprises a pedestal.

8. The garden fountain of claim 1, further comprising a wireless speaker disposed within the base portion.

9. The garden fountain of claim 1, wherein the base portion further comprises a weight chamber configured to receive a weighting material.

* * * * *